(12) United States Patent
Chida et al.

(10) Patent No.: US 10,465,777 B2
(45) Date of Patent: Nov. 5, 2019

(54) VEHICLE POWER TRANSMISSION DEVICE

(71) Applicant: TOYOTA JIDOSHA KABUSHIKI KAISHA, Toyota-shi, Aichi-ken (JP)

(72) Inventors: Ryuji Chida, Nagoya (JP); Hideaki Takahara, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 100 days.

(21) Appl. No.: 15/833,915

(22) Filed: Dec. 6, 2017

(65) Prior Publication Data

US 2018/0180147 A1 Jun. 28, 2018

(30) Foreign Application Priority Data

Dec. 24, 2016 (JP) ................................. 2016-250288

(51) Int. Cl.
*F16D 25/10* (2006.01)
*F16H 37/02* (2006.01)
*F16D 25/0638* (2006.01)

(52) U.S. Cl.
CPC ....... *F16H 37/022* (2013.01); *F16D 25/0638* (2013.01); *F16D 25/10* (2013.01); *F16H 2037/026* (2013.01)

(58) Field of Classification Search
CPC ................ F16H 37/021; F16H 37/022; F16H 2037/026; F16D 25/10
USPC .................................................. 475/116, 125
See application file for complete search history.

(56) References Cited

U.S. PATENT DOCUMENTS

| | | | | |
|---|---|---|---|---|
| 5,931,885 A * | 8/1999 | Kubo | ..................... | F16H 61/061 475/123 |
| 6,428,440 B2 * | 8/2002 | Yuasa | ................... | F16H 61/061 475/125 |
| 7,128,688 B2 * | 10/2006 | Katou | ..................... | F16D 25/10 477/98 |
| 7,395,908 B2 * | 7/2008 | Hegerath | ................ | F16D 25/10 192/113.35 |
| 9,470,329 B2 * | 10/2016 | Reisch | .................. | F16D 25/123 |
| 2007/0184936 A1 | 8/2007 | Nakayama | | |
| 2017/0051796 A1 * | 2/2017 | Downs | .................. | F16D 29/005 |
| 2019/0048943 A1 * | 2/2019 | Park | ........................ | F16D 21/06 |

FOREIGN PATENT DOCUMENTS

| | | |
|---|---|---|
| JP | H02-146365 A | 6/1990 |
| JP | 2007-205529 A | 8/2007 |
| JP | 2015-014342 A | 1/2015 |
| JP | 2016-060254 A | 4/2016 |

\* cited by examiner

*Primary Examiner* — Leslie A Nicholson, III
(74) *Attorney, Agent, or Firm* — Oliff PLC

(57) ABSTRACT

A vehicle power transmission device includes a forward first clutch between an engine and an input shaft of a continuously variable transmission, and a second clutch between an output shaft of the continuously variable transmission and driving wheels. When the hydraulic fluid of the hydraulic pump is not supplied to the first disconnection device and the second disconnection device, a dragging torque generated in the second disconnection device is larger than a dragging torque generated in the first disconnection device.

5 Claims, 3 Drawing Sheets

VEHICLE POWER TRANSMISSION DEVICE

INCORPORATION BY REFERENCE

The disclosure of Japanese Patent Application No. 2016-250288 filed on Dec. 24, 2016 including the specification, drawings and abstract is incorporated herein by reference in its entirety.

BACKGROUND

1. Technical Field

The present disclosure relates to a vehicle power transmission device, and particularly to a vehicle power transmission device including a belt-type continuously variable transmission.

2. Description of Related Art

There has been known a vehicle power transmission device including: a drive source; a continuously variable transmission disposed between the drive source and driving wheels and including an input shaft configured to receive a power output from the drive source and an output shaft configured to output the power to the driving wheels; a first disconnection device configured to disconnect a first power transmission path between the drive source and the input shaft of the continuously variable transmission; a second disconnection device configured to disconnect a second power transmission path between the output shaft of the continuously variable transmission and the driving wheels; and a mechanical hydraulic pump provided on a side closer to the drive source than the first disconnection device and configured to operate by the power of the drive source. The first disconnection device and the second disconnection device disconnect the first power transmission path and the second power transmission path, respectively, by a hydraulic fluid supplied from the mechanical hydraulic pump. An example of the vehicle power transmission device is a vehicle power transmission device described in Japanese Patent Application Publication No. 2015-014342 (JP 2015-014342 A) and Japanese Patent Application Publication No. 2016-060254 (JP 2016-060254 A).

SUMMARY

JP 2015-014342 A and JP 2016-060254 A describe a vehicle power transmission device configured such that a second disconnection device is provided between an output shaft of a continuously variable transmission and driving wheels, and in addition to the second disconnection device, a first disconnection device hydraulically controlled by a hydraulic pump is provided between a drive source and an input shaft of the continuously variable transmission. Particularly, the vehicle power transmission device described in JP 2015-014342 A is provided with a first hydraulic pump operating by a power of the drive source and a second hydraulic pump operating by rotations of the driving wheels. Hereby, even in a case where driving of the drive source is stopped, the first disconnection device, the second disconnection device, and the continuously variable transmission can be hydraulically controlled by the second hydraulic pump. Accordingly, in coasting in which a vehicle runs in a state where the driving of the drive source is stopped, the first disconnection device is released to separate the drive source and the continuously variable transmission so as to improve fuel efficiency, and the second disconnection device is engaged to decrease a transmittable torque of the second disconnection device to be smaller than a transmittable torque of the continuously variable transmission, for example. Hereby, in a case where the driving wheels suddenly receive an input torque, slipping of a transmission belt of the continuously variable transmission can be restrained. However, in the vehicle power transmission device, the second hydraulic pump is rotated continuously by the rotations of the driving wheels during a vehicle running, so that the second hydraulic pump becomes a running resistance, for example, which might decrease fuel efficiency.

The present disclosure is to provide a vehicle power transmission device including a first disconnection device provided between a drive source and an input shaft of a continuously variable transmission, and a second disconnection device provided between an output shaft of the continuously variable transmission and driving wheels, and the vehicle power transmission device can restrain a decrease in fuel efficiency.

One aspect of the present disclosure is a vehicle power transmission device. The vehicle power transmission device includes: a drive source; a continuously variable transmission disposed between the drive source and driving wheels, including an input shaft receiving a power output from the drive source and an output shaft outputting the power to the driving wheels; a first disconnection device configured to disconnect the drive source and the input shaft of the continuously variable transmission; a second disconnection device configured to disconnect the output shaft of the continuously variable transmission and the driving wheels; and a hydraulic pump being configured to supply a hydraulic fluid to the first disconnection device by a power of the drive source such that between the drive source and the input shaft of the continuously variable transmission is disconnected. The hydraulic pump is configured to supply a hydraulic fluid to the second disconnection device by the power of the drive source such that between the output shaft of the continuously variable transmission and the driving wheels is disconnected. When the hydraulic fluid of the hydraulic pump is not supplied to the first disconnection device and the second disconnection device, a dragging torque generated in the second disconnection device is larger than a dragging torque generated in the first disconnection device.

According to the above configuration, in coasting in which the vehicle runs in a state where driving of the drive source is stopped, not only fuel efficiency is improved due to the drive source being separated from the continuously variable transmission by disengagement of the first disconnection device, but also slipping of a transmission belt in the continuously variable transmission can be restrained at the time when an input torque is suddenly input in the driving wheels, even if a hydraulic control component such as a hydraulic pump is not provided between the second disconnection device and the driving wheels. Further, it is not necessary to provide a hydraulic pump serving as a running resistance during a vehicle running between the second disconnection device and the driving wheels, thereby making it possible to restrain a decrease in fuel efficiency due to the hydraulic pump.

The dragging torque generated in the second disconnection device may be smaller than a torque capacity of the continuously variable transmission and larger than a multiplication value between the dragging torque of the first disconnection device and a maximum transmission ratio of a power transmission path from the first disconnection device to the second disconnection device via the continuously variable transmission.

According to the above configuration, the vehicle power transmission device includes the first disconnection device between the drive source and the input shaft of the continuously variable transmission, and the second disconnection device between the output shaft of the continuously variable transmission and the driving wheels. The dragging torque of the second disconnection device may be smaller than the torque capacity of the continuously variable transmission and to be larger than the multiplication value between the dragging torque of the first disconnection device and the maximum transmission ratio of a power transmission path from the first disconnection device to the second disconnection device via the continuously variable transmission. Hereby, even if a hydraulic pressure control is not performed by the mechanical hydraulic pump, the dragging torque of the second disconnection device in a state where the hydraulic pressure of the second disconnection device is released is smaller than the torque capacity of the continuously variable transmission and larger than the multiplication value between the dragging torque of the first disconnection device in a state where the hydraulic pressure of the first disconnection device is released and the maximum transmission ratio from the first disconnection device to the second disconnection device. Accordingly, in coasting in which the vehicle runs in a state where driving of the drive source is stopped, not only fuel efficiency is improved due to the drive source being separated from the continuously variable transmission by disengagement of the first disconnection device, but also slipping of a transmission belt in the continuously variable transmission can be restrained at the time when an input torque is suddenly input in the driving wheels, even if a hydraulic control component such as a hydraulic pump is not provided between the second disconnection device and the driving wheels. Further, it is not necessary to provide a hydraulic pump serving as a running resistance during a vehicle running between the second disconnection device and the driving wheels, thereby making it possible to restrain a decrease in fuel efficiency due to the hydraulic pump.

As another aspect, the second disconnection device may be provided in the output shaft of the continuously variable transmission; and the dragging torque of the second disconnection device may be smaller than the torque capacity of the continuously variable transmission and larger than a multiplication value between the dragging torque of the first disconnection device and a maximum transmission ratio of the continuously variable transmission.

According to the above configuration, the second disconnection device may be provided in the output shaft of the continuously variable transmission, and the dragging torque of the second disconnection device may be smaller than the torque capacity of the continuously variable transmission and to be larger than a multiplication value between the dragging torque of the first disconnection device and a maximum transmission ratio of the continuously variable transmission. Hereby, even if a hydraulic pressure control is not performed by the mechanical hydraulic pump, the dragging torque of the second disconnection device in a state where the hydraulic pressure of the second disconnection device is released is smaller than the torque capacity of the continuously variable transmission and larger than the multiplication value between the dragging torque of the first disconnection device in a state where the hydraulic pressure of the first disconnection device is released and the maximum transmission ratio from the first disconnection device to the second disconnection device. Accordingly, in the coasting in which the vehicle runs in a state where the driving of the drive source is stopped, for example, not only fuel efficiency is improved due to the drive source being separated from the continuously variable transmission by disengagement of the first disconnection device, but also slipping of the transmission belt in the continuously variable transmission can be more surely restrained at the time when an input torque is suddenly input in the driving wheels, even if a hydraulic control component such as a hydraulic pump is not provided between the second disconnection device and the driving wheels. Further, it is not necessary to provide a hydraulic pump serving as a running resistance during the vehicle running between the second disconnection device and the driving wheels, thereby making it possible to more surely restrain a decrease in fuel efficiency due to the hydraulic pump.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

One embodiment of the present disclosure is described below in detail with reference to the drawings. Note that the drawings are simplified or modified appropriately in the following embodiment, and a scale ratio, a shape, and the like of each part are not necessarily drawn precisely.

Figure 1:
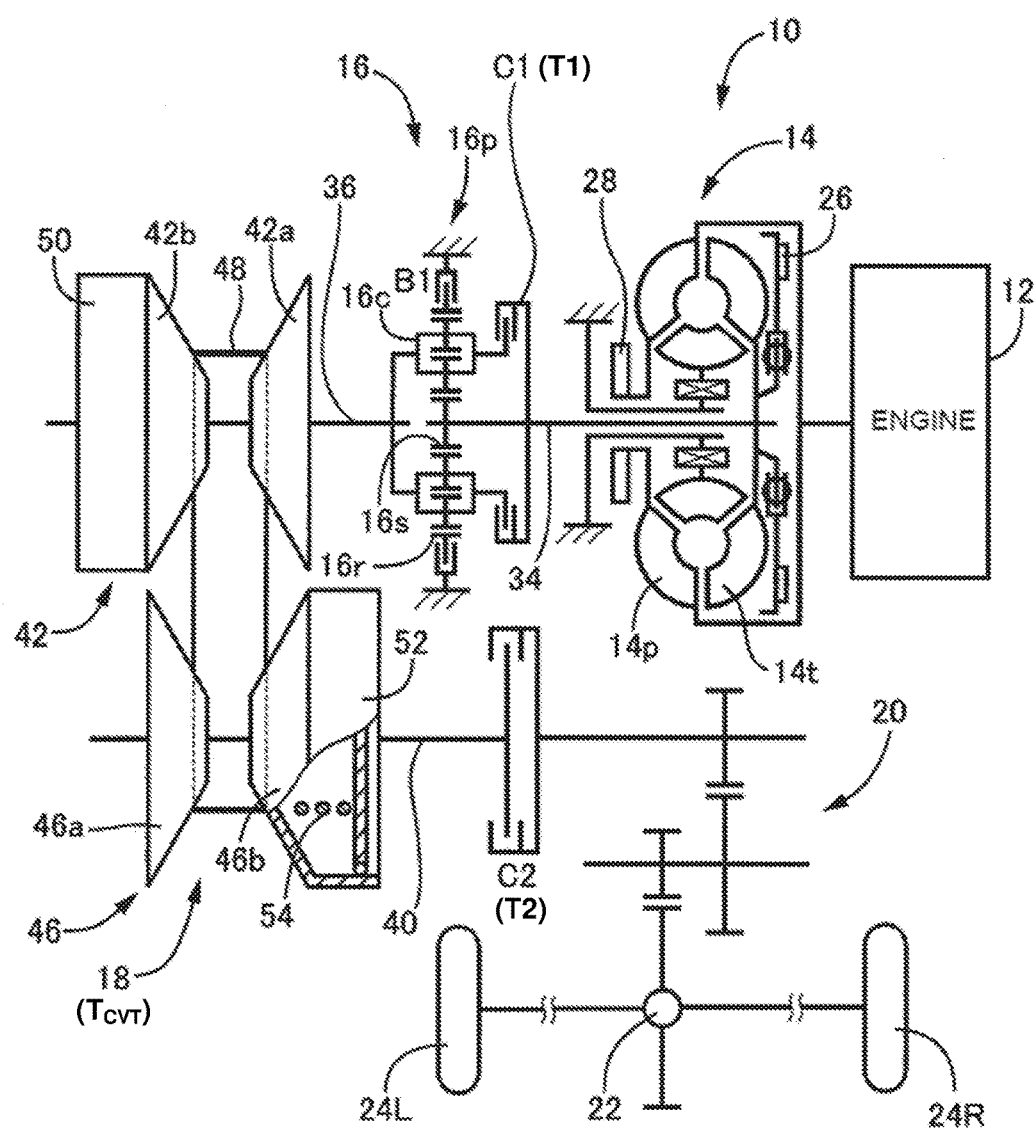
FIG. 1 is an outline view to describe a configuration of a vehicle power transmission device to which the present disclosure is applied.

FIG. 1 is an outline view to describe a configuration of a vehicle power transmission device 10 to which the present disclosure is applied. The vehicle power transmission device 10 is connected to an engine 12 as a drive source for running. The engine 12 is an internal combustion engine such as a gasoline engine or a diesel engine, for example. A power output from the engine 12 is transmitted to a differential gear mechanism 22 from a crankshaft of the engine 12, via a torque converter 14 as a fluid-type transmission device, a forward/reverse switching device 16, a belt-type continuously variable transmission (CVT) 18, and a reduction gear 20, and is then distributed between left and right driving wheels 24L, 24R.

The torque converter 14 includes a pump impeller 14$p$ connected to the crankshaft of the engine 12, and a turbine impeller 14$t$ connected to the forward/reverse switching device 16 via a turbine shaft 34 corresponding to an output-side member of the torque converter 14. The torque converter 14 is configured to perform power transmission between the impellers via a fluid (hydraulic fluid). Further, a lock-up clutch 26 is provided between the pump impeller 14$p$ and the turbine impeller 14$t$. The hydraulic fluid subjected to a pressure control by a lock-up control valve (not shown) is supplied to the lock-up clutch 26. When the hydraulic fluid thus subjected to the pressure control is supplied to an engaging-side hydraulic chamber (not shown) of the lock-up clutch 26, the lock-up clutch 26 is engaged, and when the hydraulic fluid thus subjected to the pressure control is supplied to a disengagement-side hydraulic chamber (not shown) of the lock-up clutch 26, the lock-up clutch 26 is disengaged. When the lock-up clutch 26 is completely engaged, the pump impeller 14$p$ and the turbine impeller 14$t$ are rotated together in an integrated manner. Further, a mechanical hydraulic pump 28 is connected to the pump impeller 14$p$. The mechanical hydraulic pump 28 is configured to generate a hydraulic pressure to perform a speed control and a belt clamping pressure control of the continuously variable transmission 18, a control of engagement and disengagement of the lock-up clutch 26, and the like. The mechanical hydraulic pump 28 is operated in conjunction with a rotation of the engine 12.

The forward/reverse switching device 16 is mainly constituted by a forward first clutch C1, a reverse brake B1, and a double-pinion-type planetary gear 16$p$. A sun gear 16$s$ of the planetary gear 16$p$ is connected integrally to a turbine shaft 34 of the torque converter 14, and a carrier 16$c$ is connected integrally to an input shaft 36 of the continuously variable transmission 18. The carrier 16$c$ and the sun gear 16$s$ are connected selectively via the forward first clutch C1, and a ring gear 16$r$ is selectively fixed to a transmission case via the reverse brake B1. The forward first clutch C1 and the reverse brake B1 are both hydraulic frictional engagement devices to be frictionally engaged by a hydraulic actuator of a hydraulic cylinder and the like. A hydraulic fluid supplied from the mechanical hydraulic pump 28 is subjected to a pressure control performed by a manual valve (not shown) provided in an after-mentioned hydraulic-pressure control circuit 76 illustrated in FIG. 2. When the hydraulic fluid supplied to the forward first clutch C1 and the reverse brake B1 is subjected to the pressure control, the forward first clutch C1 and the reverse brake B1 are engaged or disengaged.

The forward/reverse switching device 16 disconnects a first power transmission path between the engine 12 and the input shaft 36 of the continuously variable transmission 18. More specifically, the forward/reverse switching device 16 is configured such that, when the forward first clutch C1 is engaged and the reverse brake B1 is disengaged, the forward/reverse switching device 16 is rotated in an integrated manner to directly connect the turbine shaft 34 to the input shaft 36, so that the first power transmission path is established and a driving force in a forward direction is transmitted to the driving wheels 24R and 24L. Further, when the reverse brake B1 is engaged and the forward first clutch C1 is disengaged, the input shaft 36 is rotated reversely relative to the turbine shaft 34, so that a driving force in a reverse direction is transmitted to the driving wheels 24R and 24L. Further, when the forward first clutch C1 and the reverse brake B1 are both disengaged, the first power transmission path enters a neutral state (a power transmission disconnected state) where the first power transmission path is disconnected. In the present embodiment, the forward first clutch C1 functions as a first disconnection device.

The continuously variable transmission 18 includes the input shaft 36 and an output shaft 40 provided in parallel to each other and rotatable around respective axial centers. The input shaft 36 is provided with a primary pulley 42, and the output shaft 40 is provided with a secondary pulley 46. A transmission belt 48 is wound around respective V-grooves formed in the primary pulley 42 and the secondary pulley 46, and power transmission is performed by a frictional force between the transmission belt 48 and each of the primary pulley 42 and the secondary pulley 46. The continuously variable transmission 18 includes a primary-pulley-side hydraulic cylinder 50 and a secondary-pulley-side hydraulic cylinder 52 configured to apply a thrust to change widths of respective V-grooves of the primary pulley 42 and the secondary pulley 46 and to apply a clamping pressure to the transmission belt 48. The primary pulley 42 and the secondary pulley 46 are constituted by respective fixed sheave 42$a$ and 46$a$ fixed to the input shaft 36 and the output shaft 40, respectively, and respective moving sheaves 42$b$ and 46$b$ provided non-rotatable around respective axial centers relative to the input shaft 36 and the output shaft 40, respectively, but movable in respective axial-center directions. The primary pulley 42 and the secondary pulley 46 are configured such that, when a hydraulic fluid supplied to the primary-pulley-side hydraulic cylinder 50 is subjected to a pressure control by a speed-control solenoid valve (not shown) provided inside the after-mentioned hydraulic-pressure control circuit 76 illustrated in FIG. 2, respective V-groove widths between the fixed sheave 42$a$ and the moving sheave 42$b$ and between the fixed sheave 46$a$ and the moving sheave 46$b$ are changed. Further, the primary pulley 42 and the secondary pulley 46 are configured such that, when a hydraulic fluid to be supplied to the secondary-pulley-side hydraulic cylinder 52 is subjected to a pressure control by a clamping-pressure-control solenoid valve (not shown) provided inside the after-mentioned hydraulic-pressure control circuit 76 illustrated in FIG. 2, respective clamping pressures of the primary pulley 42 and the secondary pulley 46 with respect to the transmission belt 48 are adjusted.

The continuously variable transmission 18 is configured such that respective groove widths of the primary pulley 42 and the secondary pulley 46 are changed in accordance with a vehicle running state, so that wound radiuses (effective radiuses) of the transmission belt 48 with respect to the primary pulley 42 and the secondary pulley 46 are changed. Hereby, a transmission ratio γ (=input-shaft rotation speed Nin/output-shaft rotation speed Nout) of the continuously variable transmission 18 is changed continuously. Further, respective clamping pressures of the primary pulley 42 and the secondary pulley 46 with respect to the transmission belt 48 are adjusted, so that slipping of the transmission belt 48 is restrained. Here, for example, in a case where the hydraulic fluid subjected to the pressure control is not supplied to the continuously variable transmission 18, that is, in a case where the hydraulic pressure of the continuously variable transmission 18 is released, a biasing force of a spring 54 provided inside the secondary-pulley-side hydraulic cylinder 52 causes the moving sheaves 42$b$ and 46$b$ to move in respective axial-center directions of the input shaft 36 and the output shaft 40, so that the continuously variable transmission 18 forms a lowest transmission ratio γmax.

A second clutch C2 that functions as a second disconnection device is a hydraulic frictional engagement device to be frictionally engaged by a hydraulic actuator of a hydraulic cylinder and the like, for example. A hydraulic fluid supplied from the mechanical hydraulic pump 28 is subjected to a pressure control by a manual valve (not shown) provided in the after-mentioned hydraulic-pressure control circuit 76 illustrated in FIG. 2. When the hydraulic fluid supplied to the second clutch C2 is subjected to the pressure control as such, the second clutch C2 is engaged or disengaged.

The second clutch C2 disconnects a second power transmission path between the output shaft 40 of the continuously variable transmission 18 and the left and right driving wheels 24L, 24R. When the second clutch C2 is engaged, the second power transmission path between the output shaft 40 and the left and right driving wheels 24L, 24R is connected, so that a power is transmitted to the left and right driving wheels 24L, 24R.

Figure 2:
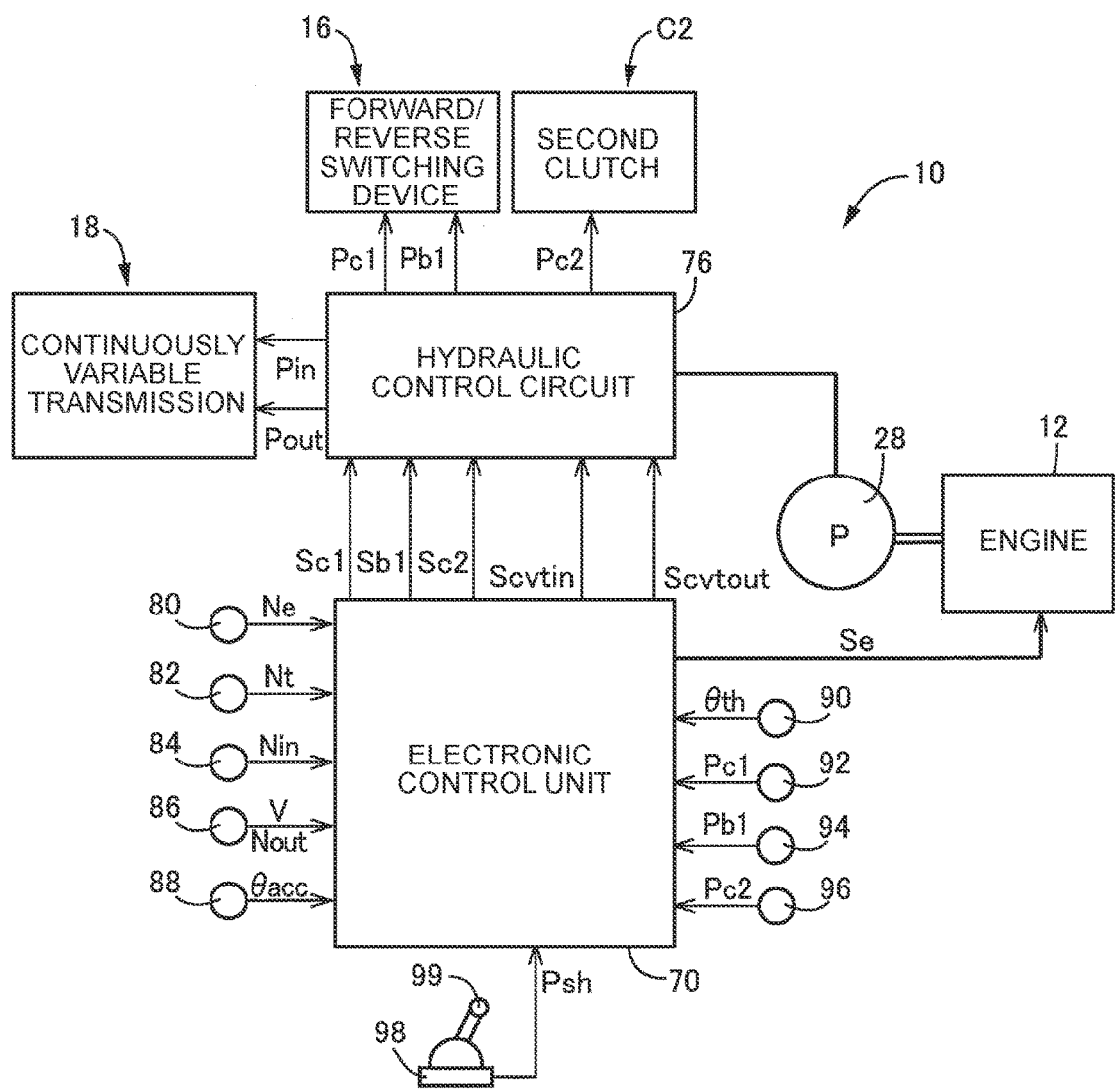
FIG. 2 is a view to describe an essential part of a control system for various controls in the vehicle power transmission device in FIG. 1.

FIG. 2 is a view to describe an essential part of a control system for various controls in the vehicle power transmission device 10 in FIG. 1. An electronic control unit 70 illustrated in FIG. 2 includes a so-called microcomputer constituted by a CPU, a RAM, a ROM, an input-output interface, and so on. The CPU uses a temporary memory function of the RAM and performs signal processing according to a program stored in the ROM in advance, so as to execute various controls of the vehicle power transmission device 10. For example, the electronic control unit 70 is configured to execute a speed control and the like including an output control of the engine 12 and a transmission belt clamping pressure control of the continuously variable transmission 18, and is configured separately for an engine control, for a hydraulic control, and the like purpose, as needed.

Various actual values based on detection signals from various sensors are supplied to the electronic control unit 70. The various sensors include various rotation speed sensors 80, 82, 84, 86, an accelerator opening sensor 88, a throttle sensor 90, hydraulic pressure sensors 92, 94, 96, a shift position sensor 98, and the like, for example. The various actual values include, for example, an engine rotation speed Ne, a turbine rotation speed Nt, an input-shaft rotation speed Nin, an output-shaft rotation speed Nout corresponding to a vehicle speed V, an accelerator opening degree θacc, a throttle valve opening degree θth, a hydraulic pressure (that is, a forward first clutch hydraulic pressure) Pc1 supplied to the forward first clutch C1, a hydraulic pressure (that is, a reverse brake hydraulic pressure) Pb1 supplied to the reverse brake B1, a hydraulic pressure (that is, a second clutch hydraulic pressure) Pc2 supplied to the second clutch C2, a shift operation position (also referred to as a shift position or a lever position) Psh corresponding to positional information of a shift lever 99 as a shift operating member, and the like. Further, the electronic control unit 70 supplies various output signals to respective devices (e.g., the engine 12, the hydraulic-pressure control circuit 76, and the like). The various output signals include, for example, an engine output control command signal Se for the output control of the engine 12, hydraulic pressure control command signals Scvtin, Scvtout for hydraulic pressure controls related to gear shifting or the like of the continuously variable transmission 18, hydraulic pressure control command signals Sc1, Sb1, Sc2 for hydraulic pressure controls related to engaging operations of the forward first clutch C1, the reverse brake B1, and further the second clutch C2, and the like.

The hydraulic-pressure control circuit 76 supplies a primary-pulley-side hydraulic pressure Pin and a secondary-pulley-side hydraulic pressure Pout to the continuously variable transmission 18 based on various signals from the electronic control unit 70. Further, the hydraulic-pressure control circuit 76 supplies a forward first clutch hydraulic pressure Pc1 and a reverse brake hydraulic pressure Pb1 to the forward/reverse switching device 16, and supplies a second clutch hydraulic pressure Pc2 to the second clutch C2.

The shift lever 99 is manually operated selectively to a shift operation position Psh such as "P," "R," "N," and "D," for example. The shift operation position "P" is a parking operation position P at which a parking position (P position) of the vehicle power transmission device 10 is selected and the forward first clutch C1 and the reverse brake B1 are both disengaged, so as to cause the vehicle power transmission device 10 to enter a neutral state in which the first power transmission path is disconnected and to mechanically prevent a rotation of the output shaft 40. Further, the shift operation position "R" is a reverse running operation position R at which a reverse running position (R position) of the vehicle power transmission device 10 is selected so as to engage the reverse brake B1 and to cause the vehicle power transmission device 10 to enter a reverse running performable state in which a reverse power transmission path for reverse running is established. Further, the shift operation position "N" is a neutral operation position N at which a neutral position (N position) of the vehicle power transmission device 10 is selected, so as to cause the vehicle power transmission device 10 to enter a neutral state. Further, the shift operation position "D" is a forward running operation position D at which a forward running position (D position) of the vehicle power transmission device 10 is selected, so as to engage the forward first clutch C1 and to cause the vehicle power transmission device 10 to enter a forward running performable state in which a forward power transmission path for forward running is established. The parking operation position P and the neutral operation position N are non-running operation positions that inhibit the vehicle running. The reverse running operation position R and the forward running operation position D are running operation positions that enable the vehicle running.

Figure 3:
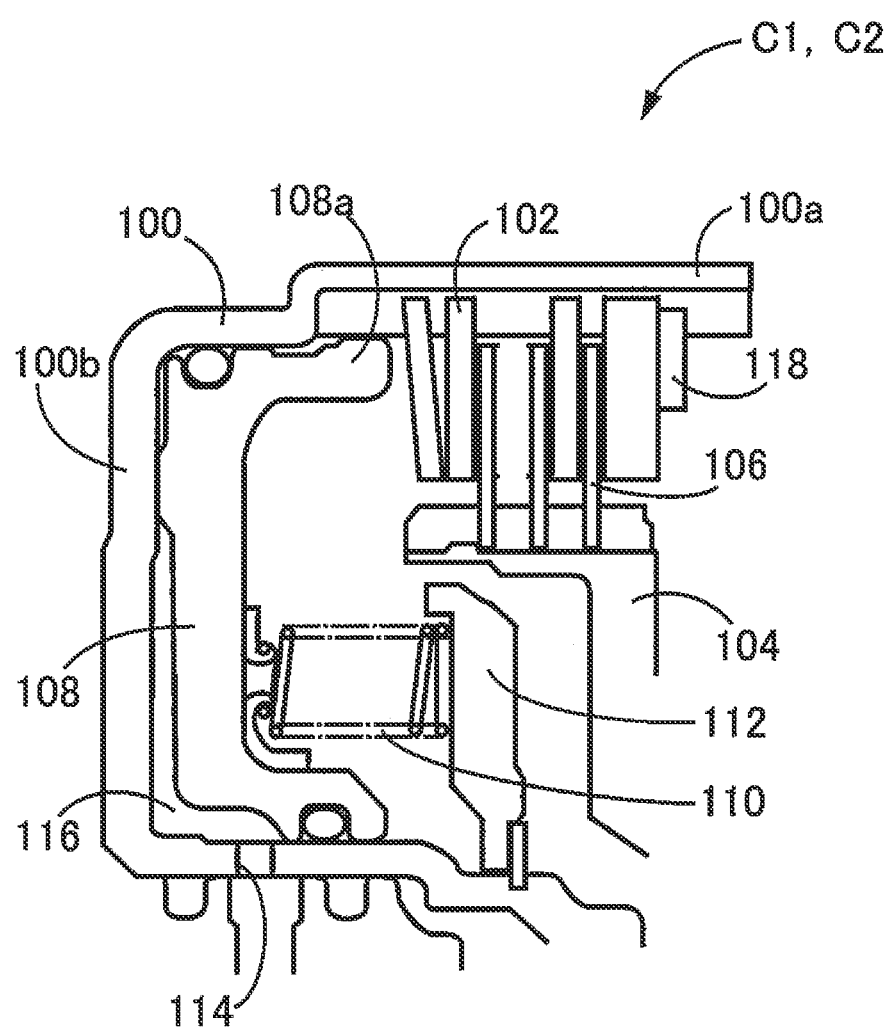
FIG. 3 is a view to schematically describe a configuration of a hydraulic frictional engagement device provided in the vehicle power transmission device in FIG. 1.

FIG. 3 is a view to schematically describe a configuration of a wet-type multi-plate hydraulic frictional engagement device provided in the vehicle power transmission device 10 in FIG. 1, and more specifically, is a partial enlarged view illustrating an example of the forward first clutch C1. As illustrated in FIG. 3, the forward first clutch C1 includes a clutch drum 100 as a first rotational member, separate plates 102 as first circular plates, a clutch hub 104 as a second rotational member concentric to the clutch drum 100, friction plates 106 as second circular plates, a piston 108, a return spring 110, and a spring support plate 112.

The separate plates 102 are configured such that outer peripheral edges of a plurality of generally annular plates (circular plates) are fitted to an inner peripheral surface of a tubular portion 100a of the clutch drum 100 in a relatively non-rotatable manner. The friction plates 106 are provided between the plurality of separate plates 102 such that inner peripheral edges of a plurality of generally annular plates (circular plates) are fitted to an outer peripheral surface of the clutch hub 104 in a relatively non-rotatable manner. The piston 108 has a pressing portion 108a provided on its outer peripheral edge so as to extend in a direction toward the separate plates 102 and the friction plates 106. The return spring 110 is provided between the piston 108 and the spring support plate 112 and biases the piston 108 so as to abut with a base plate portion 100b of the clutch drum 100. A hydraulic fluid discharged from the mechanical hydraulic pump 28 and subjected to a pressure control is supplied to an oil chamber 116 as a piston hydraulic chamber through an oil passage 114. Due to a hydraulic pressure (that is, an engaging hydraulic pressure) of the hydraulic fluid thus subjected to the pressure control, the piston 108 is moved toward the separate plates 102 and the friction plates 106 against a biasing force of the return spring 110. Here, the inner peripheral surface of the tubular portion 100a of the clutch drum 100 is provided with a snap ring 118 placed on an opposite side to the piston 108 across the friction plates 106 so as to prevent movement of the friction plates 106 in their axial-center direction. When the pressing portion 108a of the piston 108 presses the separate plates 102 and the friction plates 106 by the hydraulic pressure of the hydraulic fluid, the separate plates 102 are engaged with the friction plates 106. That is, when the hydraulic pressure is applied to the piston 108, the forward first clutch C1 is engaged. In the forward first clutch C1, the clutch drum 100 is connected integrally with the turbine shaft 34, and is mechanically connected to the engine 12. Further, the clutch hub 104 is connected integrally with the input shaft 36 and is mechanically connected to the left and right driving wheels 24L, 24R. The structure illustrated in FIG. 3 is also used for the second clutch C2, and when the hydraulic pressure is applied to the piston 108, the second clutch C2 is engaged.

In the meantime, during the vehicle running, so-called free-run coasting in which the engine 12 as the drive source is stopped and coasting is performed may be performed. In the free-run coasting, the mechanical hydraulic pump 28 is not driven due to the stop of the engine 12, so that hydraulic pressure controls of the forward first clutch C1, the continuously variable transmission 18, and the second clutch C2 are not performed. Accordingly, the hydraulic pressure is released in the forward first clutch C1, the reverse brake B1, and the second clutch C2. In the free-run coasting, the mechanical hydraulic pump 28 is not driven so that the hydraulic pressure is released in the continuously variable transmission 18. Accordingly, a transmission ratio of the continuously variable transmission 18 is to reach the lowest transmission ratio γmax due to the biasing force of the spring 54, but the transmission ratio becomes lower than γmax due to a centrifugal pressure to be generated as a vehicle speed increases. When the engine 12 is stopped in the free-run coasting, a difference in a rotation number occurs between the turbine shaft 34 and the input shaft 36 in the forward first clutch C1, so that a dragging torque T1 is generated between the separate plates 102 and the friction plates 106, for example. Here, the dragging torque is not a torque applied to the hydraulic frictional engagement device by a hydraulic pressure control, but is a mechanical dragging torque generated in a state where a controlled hydraulic pressure is not supplied. For example, a state where such a mechanical dragging torque T1 is generated in the forward first clutch C1 is a state similar to a state where the forward first clutch C1 has a predetermined torque capacity even if the hydraulic pressures of the forward first clutch C1 and the reverse brake B1 as the hydraulic frictional engagement devices are released. Accordingly, in the free-run coasting, the continuously variable transmission 18 may be able to transmit a power. Further, in the free-run coasting, similarly to the forward first clutch C1, a difference in a rotation number is generated between a power-input-side shaft and a power-output-side shaft in the second clutch C2, so that a mechanical dragging torque T2 is generated.

The mechanical dragging torques T1 and T2 of the forward first clutch C1 and the second clutch C2 are affected by a magnitude of a dragging friction torque of friction materials, that is, a dragging frictional torque of the friction plates 106, for example, other than a viscosity of a lubricant. That is, generally, by increasing a dragging friction torque of the friction plates 106, respective mechanical dragging torques T1, T2 of the forward first clutch C1 and the second clutch C2 are also increased. More specifically, the mechanical dragging torques T1 and T2 of the forward first clutch C1 and the second clutch C2 are increased by increasing the number or area of friction plates 106 that make contact with the separate plates 102.

Here, in the present embodiment, the mechanical dragging torque T2 of the second clutch C2 is set to be smaller than a torque capacity Tcvt of the continuously variable transmission 18, and to be larger than a multiplication value between the mechanical dragging torque T1 of the forward first clutch C1 and a maximum transmission ratio from the forward first clutch C1 to the second clutch C2 (a power transmission path from the forward first clutch C1 to the second clutch C2 via the continuously variable transmission). That is, the mechanical dragging torque T2 to be generated in the second clutch C2 in a state where the hydraulic pressure is released without the hydraulic pressure control is set to be smaller than the torque capacity Tcvt generated in the continuously variable transmission 18 at the lowest transmission ratio γmax in a state where the hydraulic pressure is released without the hydraulic pressure control. Further, the mechanical dragging torque T2 of the second clutch C2 in a state where the hydraulic pressure is released is set to be larger than a multiplication value between the mechanical dragging torque T1 applied to the forward first clutch C1 in a state where the hydraulic pressure is released without the hydraulic pressure control and a maximum transmission ratio from the forward first clutch C1 to the second clutch C2, that is, the lowest transmission ratio γmax. Accordingly, in the free-run coasting, the continuously variable transmission 18 is rotated based on an input torque from the left and right driving wheels 24L, 24R so that gear shifting is performable, and in a case where the input torque is suddenly input from the left and right driving wheels 24L, 24R due to irregularities of a road surface, the second clutch C2 serves as a limiter to interrupt the torque, so as to prevent slipping of the transmission belt 48 of the continuously variable transmission 18. In order to achieve the mechanical dragging torque T2 that is smaller than the torque capacity Tcvt of the continuously variable transmission 18 and larger than the multiplication value between the mechanical dragging torque T1 of the forward first clutch C1 and the lowest transmission ratio γmax, the second clutch C2 is provided with a larger number of friction plates 106 than the forward first clutch C1 so that its dragging friction torque is larger than the forward first clutch C1.

Thus, according to the present embodiment, the vehicle power transmission device 10 includes the forward first clutch C1 between the engine 12 and the input shaft 36 of the continuously variable transmission 18, and the second clutch C2 between the output shaft 40 of the continuously variable transmission 18 and the driving wheels. The mechanical dragging torque T2 of the second clutch C2 is set to be smaller than the torque capacity Tcvt of the continuously variable transmission 18 and to be larger than the multiplication value between the mechanical dragging torque T1 of the forward first clutch C1 and the maximum transmission ratio from the forward first clutch C1 to the second clutch C2. Hereby, even if the hydraulic pressure control is not performed by the mechanical hydraulic pump 28, the mechanical dragging torque T2 of the second clutch C2 in a state where the hydraulic pressure of the second clutch C2 is released is smaller than the torque capacity Tcvt of the continuously variable transmission 18 and larger than the multiplication value between the mechanical dragging torque T1 of the forward first clutch C1 in a state where the hydraulic pressure of the forward first clutch C1 is released and the maximum transmission ratio from the forward first clutch C1 to the second clutch C2. Accordingly, in the free-run coasting in which the driving of the engine 12 is stopped, for example, not only fuel efficiency is improved due to the engine 12 being separated from the continuously variable transmission 18 by disengagement of the forward first clutch C1, but also slipping of the transmission belt 48 in the continuously variable transmission 18 can be restrained at the time when an input torque is suddenly input in the left and right driving wheels 24L, 24R, even if a control component such as a hydraulic pump is not provided between the second clutch C2 and the left and right driving wheels 24L, 24R to perform the hydraulic control of the second clutch C2. Further, since gear shifting of the continuously variable transmission 18 is performed based on the input torque from the left and right driving wheels 24L, 24R during the free-run coasting, when the engine 12 is restarted to return the vehicle from the coasting to a normal running, it is possible to restrain a driver from having a feeling of slowness due to the gear shifting and to restrain a decrease in fuel efficiency, by stopping the continuously variable transmission 18 at the time when the gear shifting is unnecessary. Further, it is not necessary to provide a hydraulic pump serving as a running resistance during the vehicle running between the second clutch C2 and the left and right driving wheels 24L, 24R, thereby making it possible to restrain a decrease in fuel efficiency due to the hydraulic pump.

Further, according to the present embodiment, the second clutch C2 is provided in the output shaft 40 of the continuously variable transmission 18 and the mechanical dragging torque $T2$ of the second clutch C2 is set to be smaller than the torque capacity $Tcvt$ of the continuously variable transmission 18 and to be larger than the multiplication value between the mechanical dragging torque $T1$ of the forward first clutch C1 and the maximum transmission ratio of the continuously variable transmission 18. Hereby, even if the hydraulic pressure control is not performed by the mechanical hydraulic pump 28, the mechanical dragging torque $T2$ of the second clutch C2 in a state where the hydraulic pressure of the second clutch C2 is released is smaller than the torque capacity $Tcvt$ of the continuously variable transmission 18 and larger than the multiplication value between the mechanical dragging torque $T1$ of the forward first clutch C1 in a state where the hydraulic pressure of the forward first clutch C1 is released and the maximum transmission ratio from the forward first clutch C1 to the second clutch C2. Accordingly, in the free-run coasting in which the driving of the engine 12 is stopped, for example, not only fuel efficiency is improved due to the engine 12 being separated from the continuously variable transmission 18 by disengagement of the forward first clutch C1, but also slipping of the transmission belt 48 in the continuously variable transmission 18 can be more surely restrained at the time when an input torque is suddenly input in the left and right driving wheels 24L, 24R, even if a control component such as a hydraulic pump is not provided between the second clutch C2 and the left and right driving wheels 24L, 24R to perform the hydraulic control of the second clutch C2. Further, since gear shifting of the continuously variable transmission 18 is performed based on the input torque from the left and right driving wheels 24L, 24R during the free-run coasting, when the engine 12 is restarted to return the vehicle from the coasting to the normal running, it is possible to more surely restrain the driver from having a feeling of slowness due to the gear shifting and to restrain a decrease in fuel efficiency, by stopping the continuously variable transmission 18 at the time when the gear shifting is unnecessary. Further, it is not necessary to provide a hydraulic pump serving as a running resistance during the vehicle running, thereby making it possible to restrain a decrease in fuel efficiency due to the hydraulic pump.

The preferred embodiment of the present disclosure has been described in detail with reference to the drawings. However, the present disclosure is not limited to this, and is further performable in other modes.

For example, in the above embodiment, a plurality of friction plates 106 for the second clutch C2 and a plurality of friction plates 106 for the forward first clutch C1 are provided so that the mechanical dragging torque $T2$ of the second clutch C2 is set to be larger than the multiplication value between the mechanical dragging torque $T1$ of the forward first clutch C1 and the maximum transmission ratio from the forward first clutch C1 to the second clutch C2. However, the present disclosure is not necessarily limited to this, and respective diameters of the friction plates 106 for the second clutch C2 and the friction plates 106 for the forward first clutch C1 may be made larger so as to increase their respective contact areas with respect to the separate plates 102. Further, the friction plates 106 for the second clutch C2 may be provided such that a diameter thereof is larger than that of the friction plates 106 for the forward first clutch C1 and the number of friction plates 106 for the second clutch C2 is larger than the number of friction plates 106 for the forward first clutch C1, so that the mechanical dragging torque $T2$ of the second clutch C2 is larger than the multiplication value between the mechanical dragging torque $T1$ of the forward first clutch C1 and the maximum transmission ratio from the forward first clutch C1 to the second clutch C2.

Further, in the above embodiment, the second clutch C2 is provided with a larger number of friction plates 106 than the forward first clutch C1, so that the mechanical dragging torque $T2$ of the second clutch C2 is larger than the multiplication value between the mechanical dragging torque $T1$ of the forward first clutch C1 and the maximum transmission ratio from the forward first clutch C1 to the second clutch C2. However, the present disclosure is not necessarily limited to this, and component parts of the second clutch C2 and the forward first clutch C1 may be provided with a spring for setting of a dragging torque, so that the mechanical dragging torque $T2$ of the second clutch C2 is larger than the multiplication value between the mechanical dragging torque $T1$ of the forward first clutch C1 and the maximum transmission ratio from the forward first clutch C1 to the second clutch C2.

Further, in the above embodiment, the forward first clutch C1 and the second clutch C2 are wet-type multi-plate hydraulic frictional engagement devices. However, the present disclosure is not limited to this, and the forward first clutch C1 and the second clutch C2 may be dry-type multi-plate hydraulic frictional engagement devices.

One aspect of the present disclosure is a vehicle power transmission device. The vehicle power transmission device includes: a drive source; a continuously variable transmission disposed between the drive source and driving wheels, including an input shaft receiving a power output from the drive source and an output shaft outputting the power to the driving wheels; a first disconnection device configured to disconnect a first power transmission path between the drive source and the input shaft of the continuously variable transmission; a second disconnection device configured to disconnect a second power transmission path between the output shaft of the continuously variable transmission and the driving wheels; and a mechanical hydraulic pump provided on a side closer to the drive source than the first disconnection device, configured to operate by the power of the drive source. The first disconnection device and the second disconnection device disconnect the first power transmission path and the second power transmission path, respectively, by hydraulic fluids supplied from the mechanical hydraulic pump. A dragging torque of the second disconnection device is smaller than a torque capacity of the continuously variable transmission and is larger than a multiplication value between a dragging torque of the first disconnection device and a maximum transmission ratio of a power transmission path from the first disconnection device to the second disconnection device via the continuously variable transmission.

The embodiment of the present disclosure has been described above in detail with reference to the drawings, but this is merely one embodiment to the utmost, and the present disclosure can be performed in embodiments to which various changes and improvements are added based on the knowledge of a person skilled in the art without departing from the gist of the disclosure, although they are not exemplified.

What is claimed is:

1. A vehicle power transmission device comprising:
   a drive source;
   a continuously variable transmission disposed between the drive source and driving wheels, including an input shaft receiving a power output from the drive source and an output shaft outputting the power to the driving wheels;
   a first disconnection device configured to disconnect a first power transmission path between the drive source and the input shaft of the continuously variable transmission;
   a second disconnection device configured to disconnect a second power transmission path between the output shaft of the continuously variable transmission and the driving wheels; and
   a mechanical hydraulic pump provided on a side closer to the drive source than the first disconnection device, configured to operate by the power of the drive source, wherein
   the first disconnection device and the second disconnection device disconnect the first power transmission path and the second power transmission path, respectively, by hydraulic fluids supplied from the mechanical hydraulic pump, and
   a dragging torque of the second disconnection device is smaller than a torque capacity of the continuously variable transmission and is larger than a multiplication value between a dragging torque of the first disconnection device and a maximum transmission ratio of a power transmission path from the first disconnection device to the second disconnection device via the continuously variable transmission.

2. The vehicle power transmission device according to claim 1, wherein
   the second disconnection device is provided in the output shaft of the continuously variable transmission, and the dragging torque of the second disconnection device is smaller than torque capacity of the continuously variable transmission, and is larger than a multiplication value between the dragging torque of the first disconnection device and a maximum transmission ratio of the continuously variable transmission.

3. A vehicle power transmission device comprising:
   a drive source;
   a continuously variable transmission disposed between the drive source and driving wheels, including an input shaft receiving a power output from the drive source and an output shaft outputting the power to the driving wheels;
   a first disconnection device configured to disconnect the drive source and the input shaft of the continuously variable transmission;
   a second disconnection device configured to disconnect the output shaft of the continuously variable transmission and the driving wheels; and
   a hydraulic pump being configured to supply a hydraulic fluid to the first disconnection device by a power of the drive source such that between the drive source and the input shaft of the continuously variable transmission is disconnected, wherein
   the hydraulic pump is configured to supply a hydraulic fluid to the second disconnection device by the power of the drive source such that between the output shaft of the continuously variable transmission and the driving wheels is disconnected; and
   when the hydraulic fluid of the hydraulic pump is not supplied to the first disconnection device and the second disconnection device, a dragging torque generated in the second disconnection device is larger than a dragging torque generated in the first disconnection device.

4. The vehicle power transmission device according to claim 3, wherein the dragging torque generated in the second disconnection device is smaller than a torque capacity of the continuously variable transmission and is larger than a multiplication value between the dragging torque of the first disconnection device and a maximum transmission ratio of a power transmission path from the first disconnection device to the second disconnection device via the continuously variable transmission.

5. The vehicle power transmission device according to claim 3, wherein
   the second disconnection device is provided in the output shaft of the continuously variable transmission, and the dragging torque of the second disconnection device is smaller than torque capacity of the continuously variable transmission and is larger than a multiplication value between the dragging torque of the first disconnection device and a maximum transmission ratio of the continuously variable transmission.

* * * * *